No. 872,590. PATENTED DEC. 3, 1907.
J. STURROCK & A. L. JOHNSON.
GRAIN DRILL.
APPLICATION FILED JUNE 8, 1907.
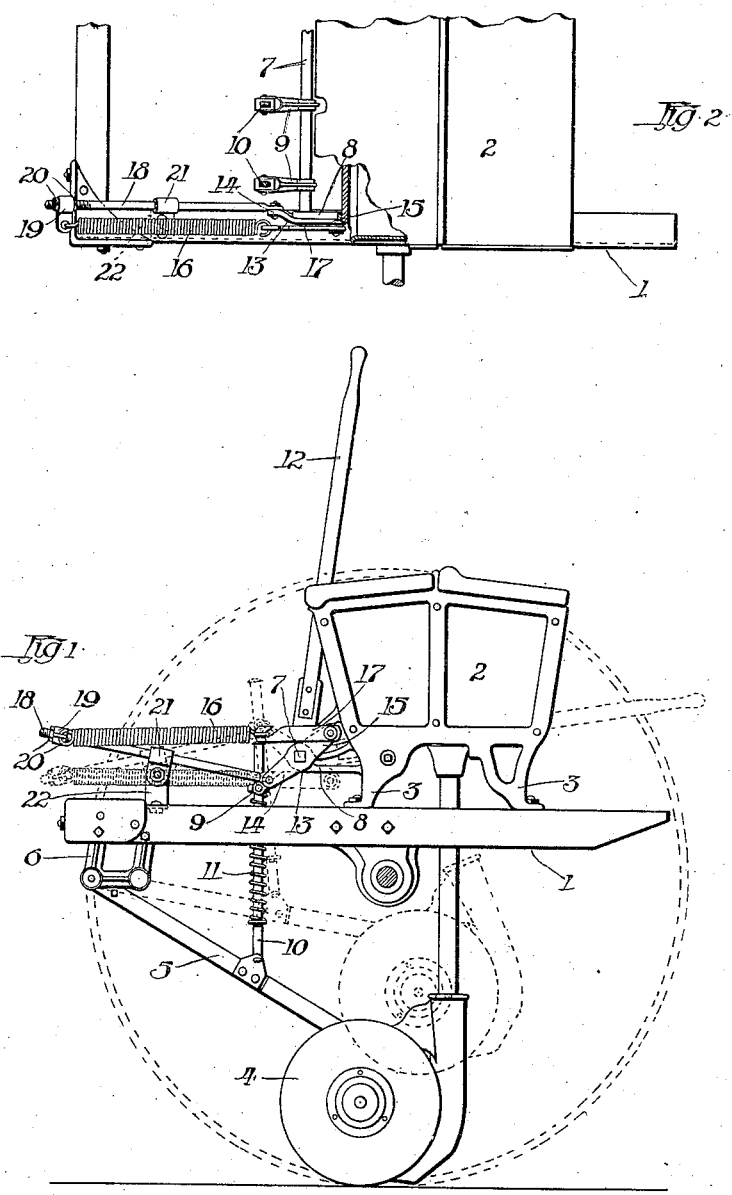
Witnesses:
F. W. Hoffmeister,
J. N. Daggett.
Inventors:
John Sturrock
and
Andrew L. Johnson
By C. W. Burgess
Attorney

UNITED STATES PATENT OFFICE.

JOHN STURROCK AND ANDREW L. JOHNSON, OF HAMILTON, ONTARIO, CANADA, ASSIGNORS TO INTERNATIONAL HARVESTER COMPANY, A CORPORATION OF NEW JERSEY.

GRAIN-DRILL.

No. 872,590.      Specification of Letters Patent.      Patented Dec. 3, 1907.

Application filed June 8, 1907. Serial No. 377,867.

*To all whom it may concern:*

Be it known that we, JOHN STURROCK, a subject of the King of Great Britain, and ANDREW L. JOHNSON, a citizen of the United States, both residing at Hamilton, in the county of Wentworth and Province of Ontario, Canada, have invented certain new and useful Improvements in Grain-Drills, of which the following is a specification.

This invention relates to grain drills having wheel frames to which are pivotally secured a series of trailing drag-bars having furrow-openers secured to their rear ends, said drag-bars usually having independent movement in vertical planes and provided with single means for simultaneously elevating or depressing the entire series, said means usually consisting in a rock-shaft suitably mounted upon the wheel frame and having lever and link connection with the individual drag-bars, and a lever connected therewith whereby the shaft may be rocked in its supports.

The object of the invention is to provide a counterbalancing spring mechanism in connection with the rock-shaft whereby the operative force of the spring is effective to press the furrow-openers in contact with the soil when the shaft is rocked in one direction, and to sustain them in an elevated position when said shaft is rocked in an opposite direction. We attain this object by the mechanism illustrated in the accompanying drawing, in which—

Figure 1 is an end elevation of part of a grain drill, and a side view of our improvement forming a part thereof; and Fig. 2 is a top plan view of a part of Fig. 1, partly in section.

Referring to the drawings, in which the same reference numerals designate like parts throughout the several views, 1 is a part of the main frame upon which is mounted a seed hopper 2, having end members 3 at opposite ends thereof and whereby it is secured to the main frame.

4 represents one of a series of furrow-openers that are suitably mounted at the rear ends of drag-bars designated by the numeral 5 and having their forward ends pivotally connected with the forward side of the main frame by means of depending brackets 6, in a manner to permit the furrow-openers to rise and fall in vertical planes.

7 is a rock-shaft having its opposite ends journaled in arms 8 projecting forwardly from the members 3 and provided with a series of lever arms 9 secured thereto, and connected with the drag-bars by means of links 10, having their lower ends pivotally connected with the drag-bars and their upper ends slidably connected with the lever arms to a limited extent; and 11 represents springs surrounding the links and operative in the well-known way to depress the drag-bars; and 12 represents a hand lever secured to the rock-shaft, by means of which the shaft may be rocked in its bearings by the operator in a common way, all of which parts may be of the usual or other preferred form.

To assist the operator in manipulating the rock-shaft, and also to bring additional force into action for the purpose of depressing the drag-bars when in operative position, and to assist in sustaining them when in raised position, there is provided a counterbalancing spring mechanism that consists in a lever 13 secured to one end of the rock-shaft 7 and having arms 14 and 15 extending in opposite directions from the axis of said shaft; a tension spring 16, having one end pivotally connected with arm 15 by means of a link 17, and its opposite end adjustably connected to a rod 18 by means of an eye piece 19 slidably mounted upon the rod and secured in adjusted position by means of nuts 20, the opposite end of the rod being pivotally connected with the arm 14; and 21 is a fulcrum block pivotally mounted upon a bracket 22 secured to the main frame, and through which the rod 18 passes freely in a slidable manner, the swinging fulcrum being connected with the rod intermediate its ends.

In operation, with the parts in the position shown by full lines in Fig. 1, the drag-bars are in operative position and are being depressed by the force of the springs 11, and the spring 16, being strained between the arm 15 and the end of rod 18, is operative through said rod and arm 14 to rock the shaft 7 in a direction to depress said drag-bars. When the lever 12 is moved rearward to rock said shaft in an opposite direction, the drag-bars are raised, as shown by dotted lines, and rod 18, vibrating about its fulcrum, carries the spring 16 below the axis of the shaft, in which position its force is operative to maintain the shaft in a position to elevate the drag-bars; the force of the spring being neutralized when its points of connection with arm 15 and rod 18 are in line with the axis of the shaft 7 and the bearing of the rod 18 in the fulcrum 21.

What we claim as our invention, and desire to secure by Letters Patent, is:

1. In a grain drill, the combination of a main frame, furrow-openers connected therewith, means for adjusting said furrow-openers in vertical planes, said means comprising a rock-shaft having lever arms connected with said furrow-openers, means for rotating said rock-shaft, said means comprising a lever secured thereto and having arms extending in opposite directions from the axis thereof, a counterbalancing spring having one end pivotally connected with one of said arms, a rod having one end pivotally connected with the other arm, the opposite end of said counterbalancing spring being connected with the opposite end of said rod, said rod being fulcrumed intermediate its ends upon a fixed part of said main frame.

2. In a grain drill, the combination of a main frame, furrow-openers connected therewith, means for adjusting said furrow-openers in vertical planes, said means comprising a rock-shaft having lever arms connected with said furrow-openers, means for rotating said rock-shaft, said means comprising a lever secured thereto and having arms extending in opposite directions from the axis thereof, a counterbalancing spring having one end pivotally connected with one of said arms, a rod having one end pivotally connected with the other arm, the opposite end of said counterbalancing spring being connected with the opposite end of said rod, said rod being slidably connected intermediate its ends with a swinging fulcrum mounted upon a fixed part of said main frame.

3. In a grain drill, the combination of a main frame, furrow-openers connected therewith, means for adjusting said furrow-openers in vertical planes, said means comprising a rock-shaft having lever arms connected with said furrow-openers, means for rotating said rock-shaft, said means comprising a lever secured thereto and having arms extending in opposite directions from the axis thereof, a counterbalancing spring having one end pivotally connected with one of said arms, a rod having one end pivotally connected with the other arm, the opposite end of said counterbalancing spring being adjustably connected with the opposite end of said rod, said rod being slidably connected intermediate its ends with a swinging fulcrum mounted upon a fixed part of said main frame.

JOHN STURROCK.
ANDREW L. JOHNSON.

Witnesses:
A. W. TORY,
JAS. M. SHEPARD.